United States Patent
Padula et al.

(10) Patent No.: US 10,641,616 B2
(45) Date of Patent: May 5, 2020

(54) REMOTE SENSING CALIBRATION, VALIDATION, AND SIGNATURE CHARACTERIZATION FROM UNMANNED AIRCRAFT SYSTEMS

(71) Applicant: GeoThinkTank LLC, Alelxandria, VA (US)

(72) Inventors: Francis Padula, Alexandria, VA (US); Aaron Pearlman, Alexandria, VA (US)

(*) Notice: Subject to any disclaimer, the term of this patent is extended or adjusted under 35 U.S.C. 154(b) by 392 days.

(21) Appl. No.: 15/423,372

(22) Filed: Feb. 2, 2017

(65) Prior Publication Data

US 2017/0219376 A1    Aug. 3, 2017

Related U.S. Application Data

(60) Provisional application No. 62/290,339, filed on Feb. 2, 2016.

(51) Int. Cl.
| | |
|---|---|
| *G01C 25/00* | (2006.01) |
| *B64C 39/02* | (2006.01) |
| *B64G 1/00* | (2006.01) |
| *B64G 3/00* | (2006.01) |
| *G05D 1/00* | (2006.01) |
| *G01C 21/36* | (2006.01) |
| *G01S 1/00* | (2006.01) |
| *B64G 1/10* | (2006.01) |

(52) U.S. Cl.
CPC ............ *G01C 25/00* (2013.01); *B64C 39/024* (2013.01); *B64G 1/1014* (2013.01);
(Continued)

(58) Field of Classification Search
CPC .............. G01C 25/00; G01C 21/3661; B64C 2201/123; B64C 2201/127; B64C 39/024;
(Continued)

(56) References Cited

U.S. PATENT DOCUMENTS

| 7,801,330 B2 * | 9/2010 | Zhang | G06K 9/00771 348/143 |
|---|---|---|---|
| 2016/0292696 A1 * | 10/2016 | Gong | G06F 16/29 |

(Continued)

OTHER PUBLICATIONS

Kuust (J. Kuusk and A. Kuusk, "Autonomous lightweight airborne spectrometers for ground reflectance measurements", IEEE, 2010) (Year: 2010).*

(Continued)

*Primary Examiner* — Alexander Satanovsky
*Assistant Examiner* — Douglas Kay
(74) *Attorney, Agent, or Firm* — Heslin Rothenberg Farley & Mesiti P.C.

(57) ABSTRACT

A method, computer program product and system where a processor(s) configures sensor(s) on an unmanned aircraft system, to capture data related to a surface of a defined geographic area. The processor(s) navigate the unmanned aircraft system in a repeatable defined travel path proximate to the defined geographic area, such that the sensor(s) capture surface data related to the defined geographic area during the navigating, wherein a position of the unmanned aircraft system in the travel path is within a satellite view geometry of a satellite. The processor(s) maintain the unmanned aircraft system at a distance from the surface at which atmosphere does not obscure the data and obtain the data collected by the sensor(s). The processor(s) compares the data collected by the sensor(s) to data collected by one or more instruments on the satellite related to the defined geographic area to determine is the instrument(s) of the satellite are calibrated.

16 Claims, 7 Drawing Sheets

(52) U.S. Cl.
CPC ............ *B64G 1/1021* (2013.01); *B64G 3/00* (2013.01); *G01C 21/3661* (2013.01); *G01S 1/00* (2013.01); *G05D 1/0094* (2013.01); *B64C 2201/123* (2013.01); *B64C 2201/127* (2013.01)

(58) Field of Classification Search
CPC ...... B64G 1/1014; B64G 1/1021; B64G 3/00; G01S 1/00; G05D 1/0094
USPC .......................................................... 702/5
See application file for complete search history.

(56) References Cited

U.S. PATENT DOCUMENTS

2017/0200762 A1* 7/2017 Okandan ........... H01L 27/14659
2018/0362160 A1* 12/2018 Groninga ............. B64C 39/026

OTHER PUBLICATIONS

Kuusk2009 (A. Kuusk and et al, "A dataset for the validation of reflectance models", Remote Sensing of Environment 113 (2009) 889-892, Elsevier, 2009) (Year: 2009).*

Chao (H. Chao and et al, "Remote Sensing and Actuation Using Unmanned Vehicles", First Edition, The Institute of Electrical and Electronics Engineers, Inc., Published 2012 by John Wiley & Sons, Inc.) (Year: 2012).*

Bolton (W. Bolton and et al, "Environmental Monitoring: Civilian Applications of Remote Sensing", Sandia, Report, SAND97-8213, Nov. 1996) (Year: 1996).*

Burkart (A. Burkart and et al, "Angular Dependency of Hyperspectral Measurements over Wheat Characterized by a Novel UAV Based Goniometer", Remote Sens. 2015, 7(1), 725-746; https://doi.org/10.3390/rs70100725) (Year: 2015).*

* cited by examiner

REMOTE SENSING CALIBRATION, VALIDATION, AND SIGNATURE CHARACTERIZATION FROM UNMANNED AIRCRAFT SYSTEMS

CROSS-REFERENCE TO RELATED APPLICATIONS

This application claims priority to U.S. Provisional Application No. 62/290,339 filed Feb. 2, 2016, entitled, "DIRECTIONAL AND HEMISPHERIC DIRECTIONAL NEAR SURFACE MEASUREMENTS FROM UNMANNED AIRCRAFT SYSTEMS" which is incorporated herein by reference in its entirety.

STATEMENT REGARDING FEDERALLY SPONSORED RESEARCH

The disclosed invention was made with government support under Contract No. NNG14CR58 awarded by National Aeronautics and Space Administration (NASA). The government has certain rights in the invention.

FIELD OF INVENTION

The present invention relates to surface measurements from unmanned aircraft systems: the present invention is directed to support remote sensing systems (ground, airborne, and space-based) calibration/validation and target phenomenology characterization.

BACKGROUND OF INVENTION

In order to determine the performance of space-based and/or airborne sensors surface reference measurements are used. The collection of high quality surface measurements is challenging and especially at the spatial scales environmental remote sensing systems. Presently, when possible, groups of individuals (on foot) or distributed networks of sensors are deployed (at fixed sites), to utilize sensors to collect reference measurements over time. These processes are limited to specific sites (in reference to the disturbed networks), labor-intensive, prone to human error, costly, and limited due to the lack of accessibility of certain geographic regions. As a result, the collection of high quality reference data can be very limited and in some cases there is no current way to collect large samples of reference data.

SUMMARY OF INVENTION

Shortcomings of the prior art are overcome and additional advantages are provided through the provision of a method for collecting reference data for the calibration, validation, and signature characterization of remote sensing instruments. The method includes, for instance: configuring, by the one or more processors, over a communications connection, a first one or more sensors on an unmanned aircraft system, to capture data related to a surface of a defined geographic area, wherein the data comprises one or more of: near surface directional observations or hemispheric directional observations; navigating, by the one or more processors, the unmanned aircraft system in a repeatable defined flight path proximate to the defined geographic area, such that the one or more sensors capture surface data related to the defined geographic area during the navigating, wherein a position of the unmanned aircraft system in the flight path is within a remote sensing instruments view geometry; maintaining, by the one or more processors, the unmanned aircraft system at a distance from the surface at which atmosphere does not obscure the data; obtaining, by the one or more processors, the data collected by the one or more sensors; comparing, by the one or more processors, the data collected by the one or more sensors to data collected by one or more of the remote sensing instruments related to the defined geographic area; and based on the data from the one or more sensors matching the data collected by the one or more instruments of the remote sensing system, within a predefined tolerance, determining the calibration on the one or more instruments of the remote sensing system.

Shortcomings of the prior art are overcome and additional advantages are provided through the provision of a computer program product for configuring satellite instruments. The computer program product comprises a storage medium readable by a processing circuit and storing instructions for execution by the processing circuit for performing a method. The method includes, for instance: configuring, by the one or more processors, over a communications connection, a first one or more sensors on an unmanned aircraft system, to capture data related to a surface of a defined geographic area, wherein the data comprises one or more of: near surface directional observations or hemispheric directional observations; navigating, by the one or more processors, the unmanned aircraft system in a repeatable defined travel path proximate to the defined geographic area, such that the one or more sensors capture surface data related to the defined geographic area during the navigating, wherein a position of the unmanned aircraft system in the travel path is within a satellite view geometry of a satellite; maintaining, by the one or more processors, the unmanned aircraft system at a distance from the surface at which atmosphere does not obscure the data; obtaining, by the one or more processors, the data collected by the one or more sensors; comparing, by the one or more processors, the data collected by the one or more sensors to data collected by one or more instruments on the satellite related to the defined geographic area; and based on the data from the one or more sensors matching the data collected by the one or more instruments of the satellite, within a predefined tolerance, determining that the one or more instruments of the satellite are calibrated.

Shortcomings of the prior art are overcome and additional advantages are provided through a method for obtaining observations of the incoming energy and outgoing energy from the surface in support of space-based and/or airborne instrument calibration/validation and performance characterization efforts. Aspects of embodiments of the present invention obtain near surface goniometric measurements of specific targets to aid in phenomenology characterization and signature support.

Aspects of certain embodiments of the present invention are directed to support remote sensing systems (ground, airborne, and space-based) calibration/validation and signature (target phenomenology) characterization. The use of Unmanned Aircraft System (UAS) platforms combined with upward and/or downward viewing sensors to measure near surface directional or hemispheric directional observations utilized in these embodiments may provide an advantage in remote sensing capabilities that includes, but is not limited to: performance characterization, calibration, validation, monitoring and target phenomenology characterization. One aspect of this embodiment is to operate the UAS near the surface such the atmospheric contributions between the UAS sensors and surface can be neglected, resulting in a fundamental reference measurement that is equivalent to reference measurement approaches described above. Utilizing UAS in this way enables the collection of high quality reference data that was not able to be collected previously. For example the UAS and sensors provide a capability to collect data in regions not accessible from the prior art (ex. goniometric measurements of large areas, large area forest canopy measurements, complex terrain, and ship-based measurements).

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings.

DETAILED DESCRIPTION OF THE INVENTION

Figure 1:
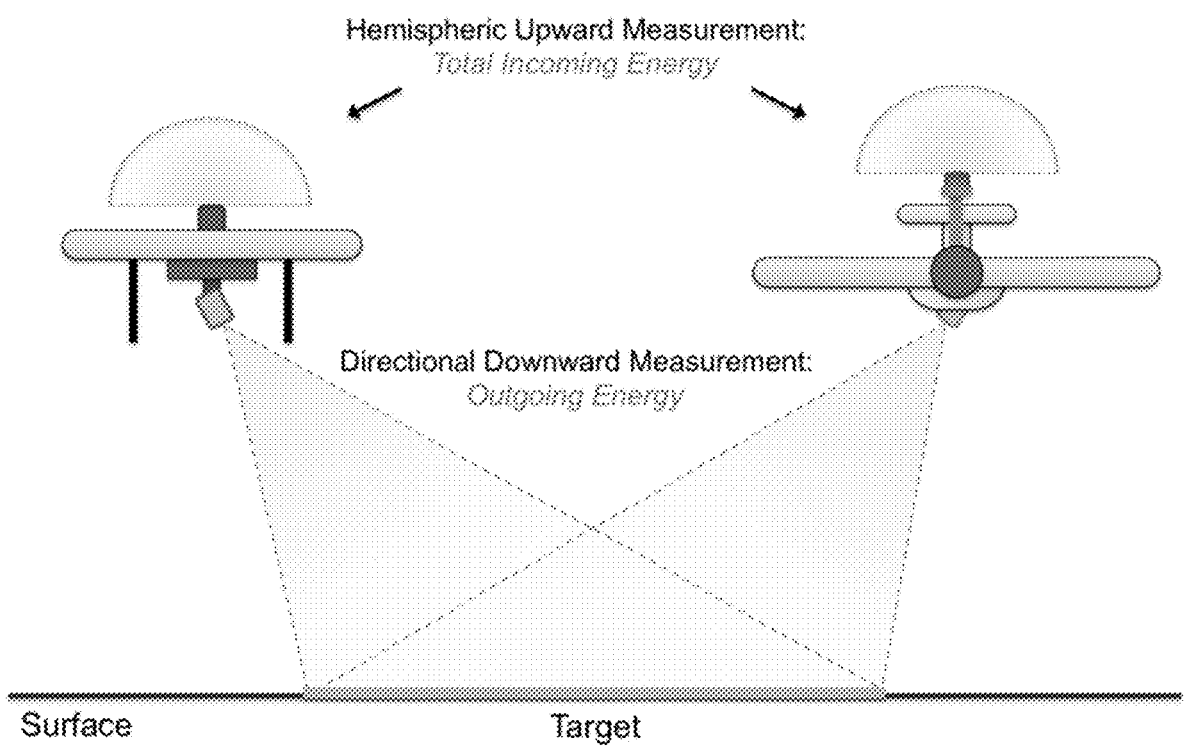
FIG. 1 is a schematic illustration of the fundamental measurement(s) (directional downward and hemispheric or directional downward only) in accordance with certain aspects of an embodiment of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

Embodiments of the present invention comprise a method and system to generate UAS based high quality ground truth/ground reference measurements for calibration/validation and characterization of remote sensing system performance and target phenomenology characterization.

High quality coincident and collocated surface measurements (i.e., ground reference/ground truth) with space-based and/or airborne observations are challenging to obtain. A fundamental approach in obtaining ground truth/ground reference measurements requires high quality observations of incoming optical energy and target outgoing energy of the target site. Heritage validation/calibration capabilities are limited in achieving the required measurement performance and needs to validate modern remote sensing systems. A significant limitation is that they often rely on target spatial/spectral uniformity assumptions, since they employ stationary ground truth collection (i.e. fixed-point measurements), manual ground truth collection via human operator(s), mobile collection with ground vehicle-mounted sensor(s), or ship-based measurements; all with unique collection constraints. Additionally, these measurements are non-ideal as they can disturb the target site during the ground truth/ground reference campaigns. Other limitations include: collection coverage with satellite space-based and/or airborne sensor(s) observations (especially for medium and low-resolution satellite sensors), labor and cost requirements (since they typically involve a large team), repeatability (i.e. repeated measurements over the same target area), and inflexibility of measurement collection geometries.

Target signatures are often collected in the field with a nadir view geometry. One reason is that goniometric measurements of surface target(s) require a complex set up that is challenging to operate in the field. Heritage directional measurements of target samples are often measured in the lab environment to characterize directional signature phenomenology.

Embodiments of the present invention offer a novel, more effective, and more accurate way to take the measurements needed at a surface to compare to measurements from a satellite, in order to calibrate the satellite. In order to calibrate the measurement and imaging systems of a satellite, because of the interferences and the distance of a satellite from the surface of Earth, measurements and images are taken at the surface of the Earth and are compared to the satellite measurements and images. If the measurements and images are not comparable, there is an issue with the instruments on the satellite, and adjustments can be made until the instruments are properly calibrated, bringing the results of the satellite to be in concert with the results of the surface measurements. Techniques to collect surface measurements from the surface are hindered both by the accessibility of certain areas as well as the introduction of human error, as the most common way to take these measurements is to deploy a group of people to manually take the measurements, when the area is accessible. These people must be relied upon to take the same measurements repeatedly in order for the data to be useful in calibrating the satellite instruments, if the patterns of measurement vary, the calibration can be affected. Thus, in embodiments of the present invention, both to eliminate these human error and human variation issues and to collect data from surfaces that were formerly inaccessible (e.g., a rainforest canopy), a UAS is utilized.

In embodiments of the present invention, rather than relying on measurements taken at the surface by a person operating an instrument, the same quality of measurements and imaging is achieved by outfitting a UAS with sensors that are comparable to those utilized in the satellite to be calibrated and the UAS is flown at a close distance above the surface, for example, between approximately 1-10 m above the surface. In embodiments of the present invention, the distance of the UAS from the surface it is measuring is determined based on selecting a distance at which the atmosphere does not obscure the measurements as the goal is to produce measurements that are equivalent to those that can be taken at the surface. Utilizing measurements from a UAS to calibrate instruments on a satellite in accordance with an embodiment of the present invention provides certain advantages over existing systems of calibration which are discussed herein. However, one such advantage is that measurements utilized to calibrate a satellite can be taken over a larger area than would be available through a manual process. Embodiments of the present invention can provide measurements spanning approximately 1-2 km. Utilizing an area of this size to collect data for calibration is not possible with existing methods and by providing this breadth of data, embodiments of the present invention assist in increasing the accuracy of the calibration of satellite instruments. Providing surface measurements over a larger area provide more opportunities to test the accuracy of the satellite and to tune its instruments.

Aspects of certain embodiments of the present invention provide advantages over existing methods of data collection for calibration because utilizing a UAS and sensors in the manner described by offering a repeatable method of obtaining surface measurements that can be utilized to calibrate satellite instruments. The types of measurements that can be taken by a UAS are described in more detail herein.

FIG. 1 is a schematic illustration of the fundamental measurement(s) (directional downward and hemispheric or directional downward only). The upward viewing sensor measurement observes total incoming energy in the hemisphere above the target. The downward viewing sensor measurement observes the outgoing target surface energy at a given view angle (or modified to collect multiple view angles).

The surface measurements from UAS provide fundamental measurement capabilities. This capability is provided through, but is not limited to, the use of using both an upward-viewing sensor—to measure total incoming optical energy over the entire hemisphere over the target—and a downward viewing measurement of the target surface—to measure reflected energy in a direction of interest—on an integrated UAS platform (FIG. 1). The UAS can be flown at altitudes close to the surface targets (approximately 1 to 20 m above the surface), where atmospheric compensation may likely be neglected, or at higher altitudes (nominally above 20 m), where compensation for atmospheric effects are more likely to be applied to the data.

One application of certain aspects of embodiments of the present invention is to derive the surface reflectance, either hyperspectral, multispectral, broadband or narrowband, in wavelength regions in the ultraviolet to short-wave infrared wavelengths (approximately 0.2 to 2.6 µm). Upward and downward measurements can be taken sequentially using an electro-optic switch, thus limiting the payload mass for longer UAS deployments and enabling the same sensor to make both measurements. An alternative approach is to integrate a system without a switch but have separate sensors designated for upward and downward viewing measurements, though this may reduce deployment times (due to a higher payload mass) and increase complexity. To ensure flexibility in integration on different UAS platforms, such systems could be designed using fiber optical components that attach to the sensing components enabling different configurations. Modular spectrometers can make hyperspectral measurements over wavelength ranges from the visible to the short wave infrared. Similarly, thermal infrared radiometer(s)/spectrometer(s) can be used to obtain directional and/or hemispheric directional measurements of surface targets. Ancillary data can be obtained from the UAS to aid the analysis of observed surface measurements that include but are not limited to: compact camera(s) (still imagery and/or video) to provide context imagery and the potential for retrieving digital elevation models of target sites, and atmospheric sensors to measure humidity, temperature and pressure for atmospheric compensation.

Certain embodiments of the present invention include another configuration, which is the use of a UAS-based platform with only a downward viewing sensor. This method requires a different measurement strategy to obtain the fundamental surface measurements: a measurement of a calibration reference (typically a tarp, panel, blackbody, water bath, or a surface of known properties) followed by or prior to a measurement of the desired target.

As understood by one of skill in the art, for simplicity of illustration, a rotary UAS is illustrated in the drawings, but a fixed-wing UAS could be used in place of the rotary UAS for the described examples or in concert with the rotary UAS as could any equivalent device known to one of skill in the art.

Figure 2:
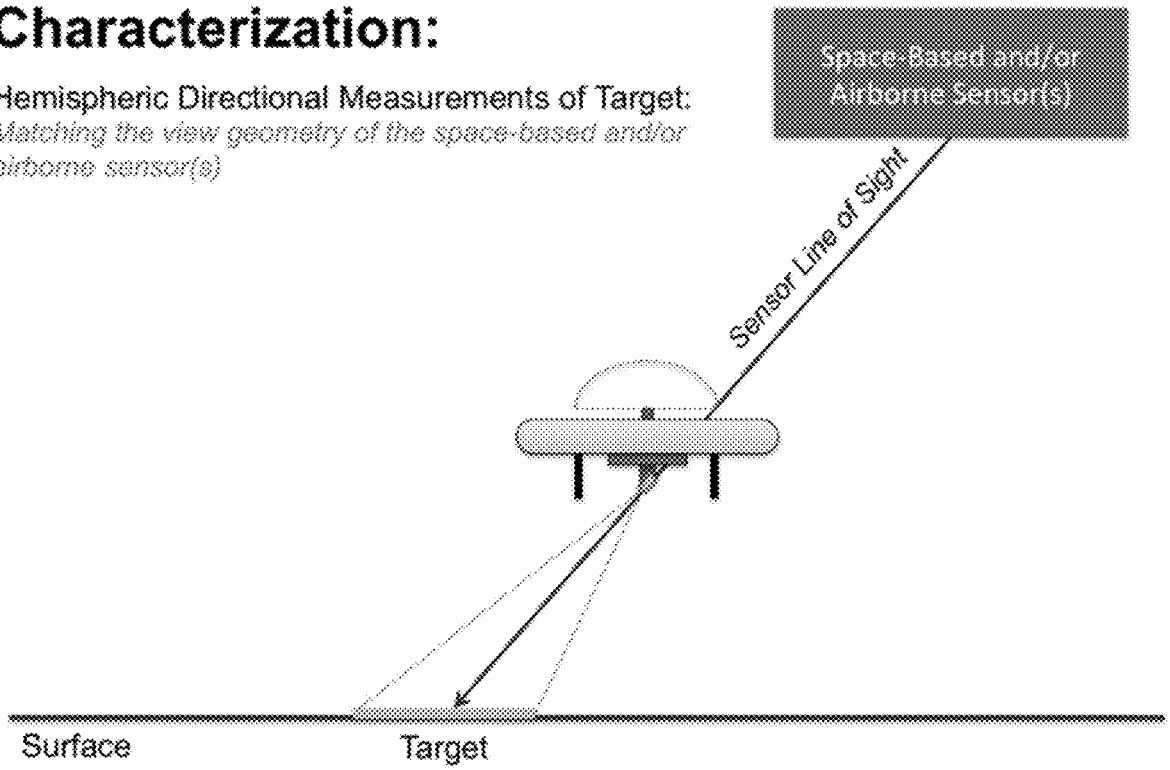
FIG. 2 is a schematic illustration (side-view) of an example application of space-based and/or airborne sensor(s) instrument performance characterization achieved by UAS sensor maneuvering and sensor gimbal control (autonomous or manually operated) in accordance with certain aspects of an embodiment of the present invention.
Figure 3:
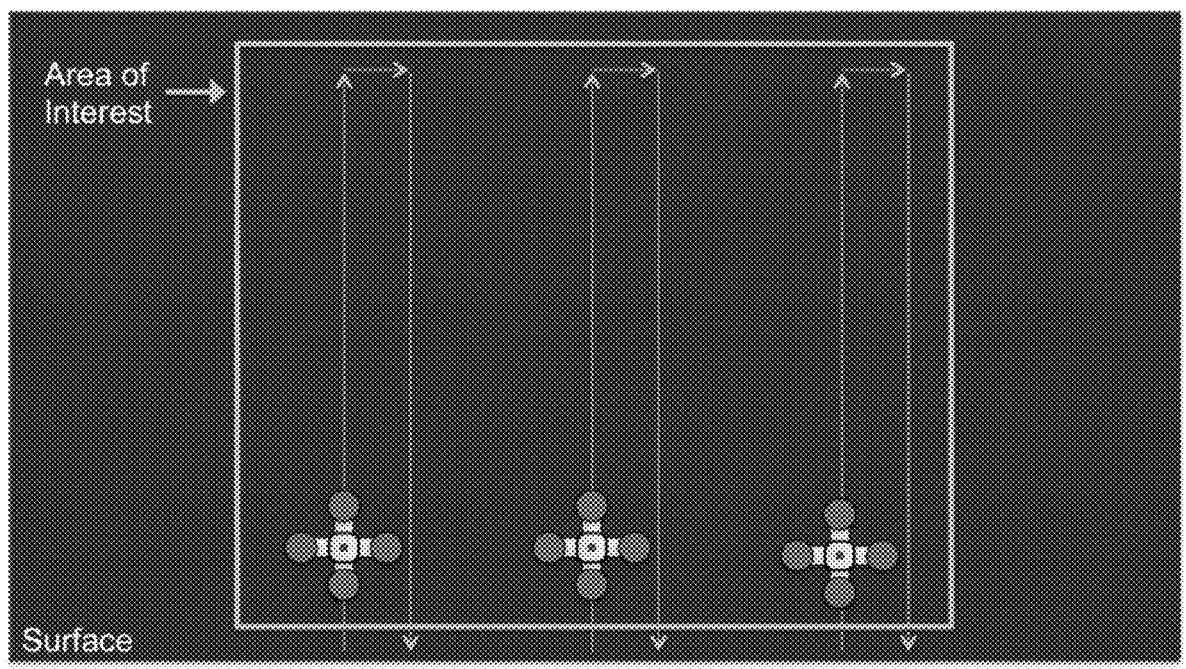
FIG. 3 is a schematic illustration (top-view) of an example application of space-based and/or airborne sensor(s) instrument performance characterization achieved by UAS sensor maneuvering and sensor gimbal control (autonomous or manually operated) in accordance with certain aspects of an embodiment of the present invention.

FIG. 2 is a schematic illustration (side-view) of an example application of space-based and/or airborne sensor(s) instrument performance characterization achieved by matching the UAS sensor view geometry with the view geometry of the space-based and/or airborne sensor(s) and FIG. 3 is a schematic illustration (top-view) of an example application of space-based and/or airborne sensor(s) instrument performance characterization achieved by matching the UAS sensor view geometry with the view geometry of the space-based and/or airborne sensor(s), emphasizing the large area collection capabilities of the UAS particularly if swarmed (i.e. multiple UAS operated simultaneously or serially).

Referring to FIGS. 2-3, an advantage of certain embodiments of the present invention is the collection of high quality ground truth/ground reference data via near surface UAS platform(s). The data collected from the UAS downward looking sensor(s) (as described in the description of FIG. 1) is matched to the view geometry of the space-based and/or airborne sensor(s) enabling undisturbed large area collection of the target site, especially if multiple UAS are used simultaneously (swarmed) or serially (FIG. 3). This approach optimizes coincident and collocated collection of the target site. If autonomous mission planning is utilized to operate the UAS, the repeatability of the ground truth/ground reference data over time is significantly improved over heritage approaches. As a result of the large area coverage, this embodiment could be implemented over ideal vicarious validation/calibration Earth targets (desert and water) or regions of low homogeneity without the need for gross uniformity assumptions. Ground truth/ground reference data of the target site would be quantified and used for comparing to aircraft or satellite instrument data to support performance characterization.

Figure 4:
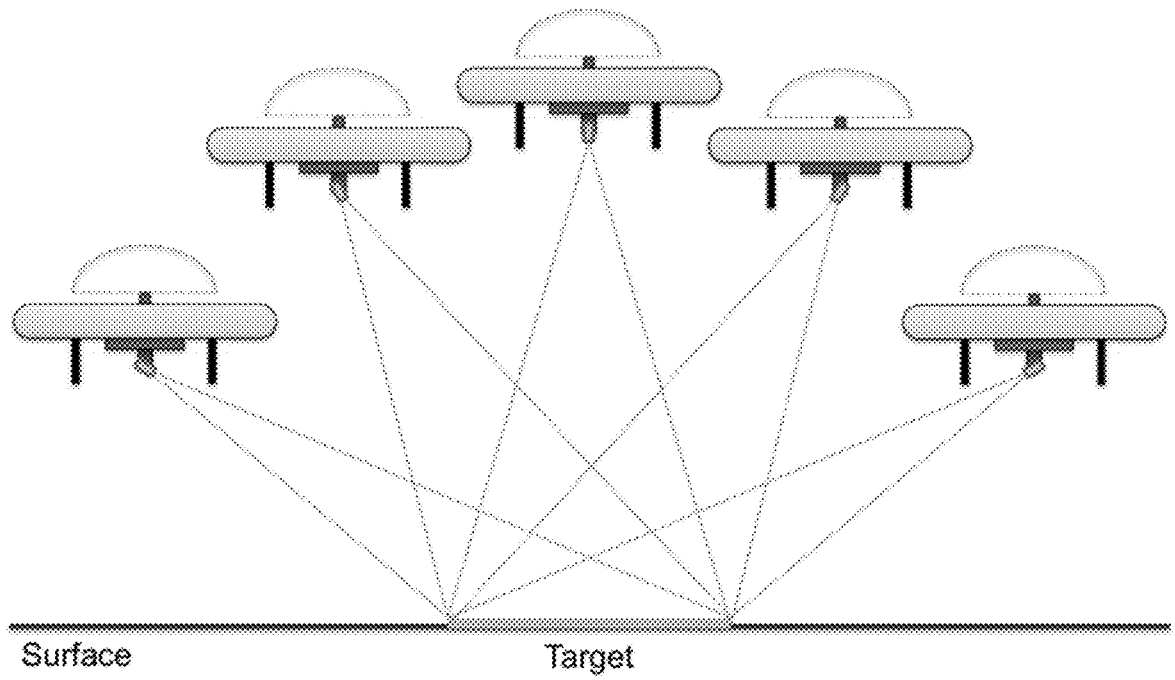
FIG. 4 is a schematic illustration (side-view) of an example application of goniometric surface measurements achieved by UAS sensor maneuvering and sensor gimbal control (autonomous or manually operated) to ensure the target of interest is collected over multiple view angles in accordance with certain aspects of an embodiment of the present invention.
Figure 5:
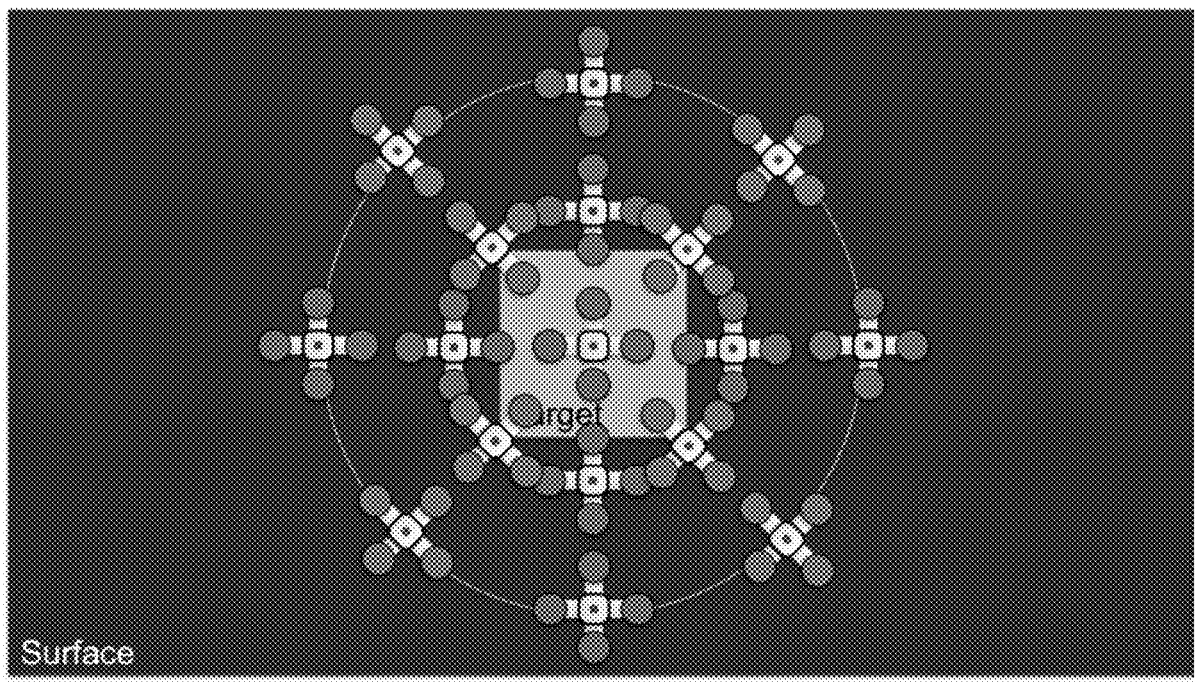
FIG. 5 is a schematic illustration (top-view) of an example application of goniometric surface measurements achieved by UAS sensor maneuvering and (autonomous or manually operated) in accordance with certain aspects of an embodiment of the present invention.
Figure 6:
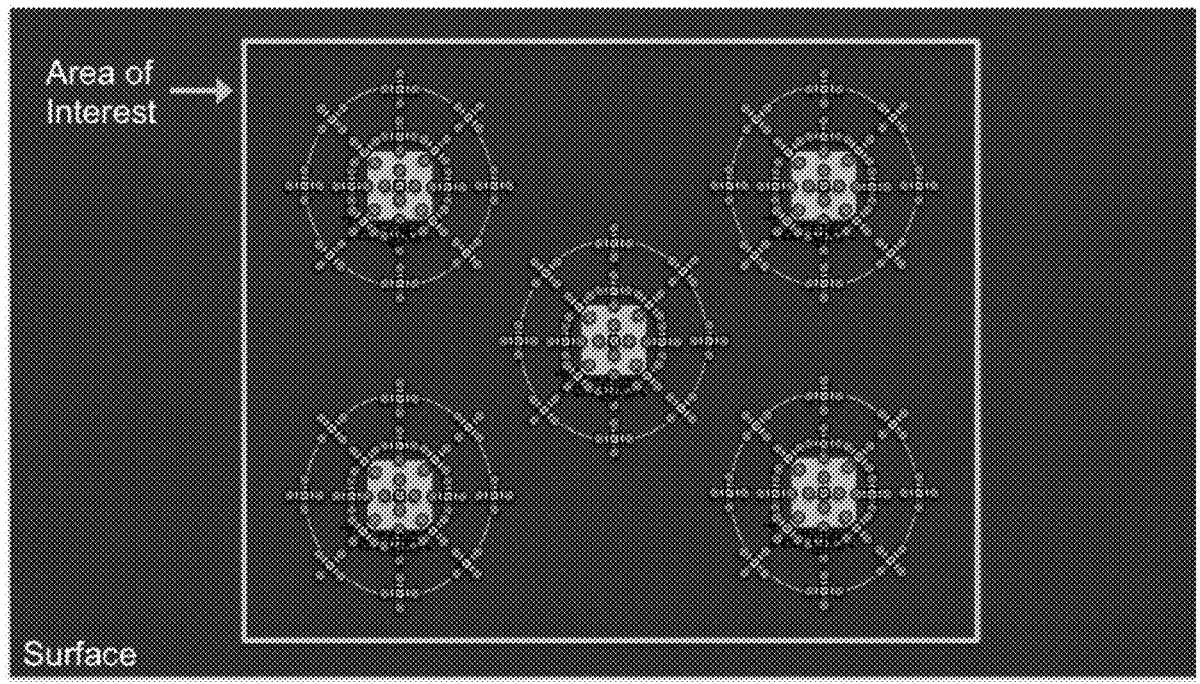
FIG. 6 is a schematic illustration (top-view) of an example application of multiple goniometric surface measurements achieved by UAS(s) (also referred to as swarming) emphasizing the large area collection capabilities of the UAS(s) in accordance with certain aspects of an embodiment of the present invention.

FIG. 4 is a schematic illustration (side-view) of an example application of goniometric surface measurements achieved by UAS sensor maneuvering and sensor gimbal control (autonomous or manually controlled) to ensure the target of interest is collected over multiple view angles. FIG. 5 is a schematic illustration (top-view) of an example application of goniometric surface measurements achieved by UAS sensor maneuvering and sensor gimbal control (autonomous or manually controlled) to ensure the target of interest is collected over multiple view angles. FIG. 6 is a schematic illustration (top-view) of an example application of multiple goniometric surface measurements achieved by UAS(s) emphasizing the large area collection capabilities of the UAS(s) particularly if swarmed (i.e. multiple UAS operated simultaneously or serially).

An advantage of certain embodiments of the present invention is that they enable the ability to collect goniometric surface measurements achieved by maneuvering a UAS sensor with sensor gimbal control (autonomous or manually controlled) to ensure the target of interest is collected over multiple view angles (FIGS. 4-5). By holding the path length between the sensor and target fixed for all view angles a directional and/or hemispheric directional set of measurements can be obtained to provide target phenomenology characterization and goniometric material databases from field measurements. The sets of collection can be conducted several times during a mission and/or several UAS could simultaneously collect sets of measurements to cover large areas (FIG. 6).

In an embodiments of the present invention, the UAS and/or sensor can be communicatively coupled to a computer system and the measurements can be processed and displayed by the computer system for ease of utilization by a user of the computer system. A program executing on a resource of a computing system could assist in the implementation of the above-described method and could control certain elements thereof.

Figure 7:
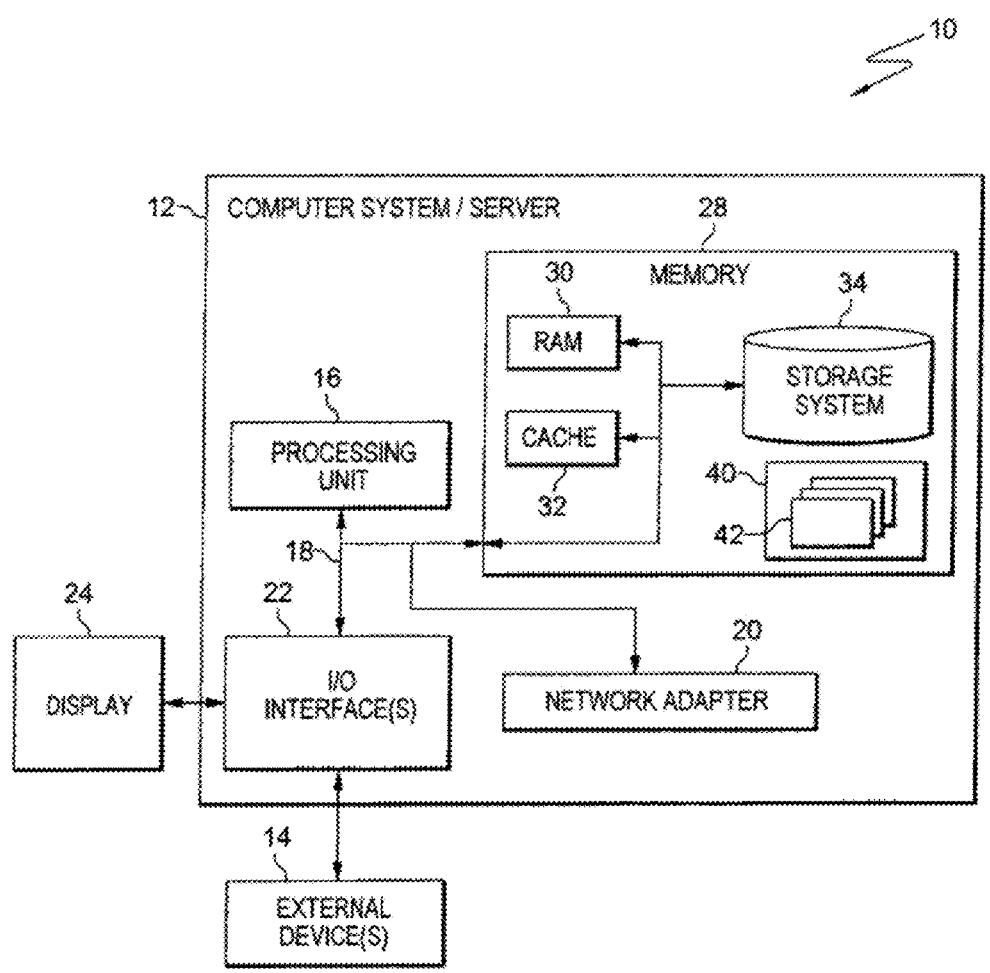
FIG. 7 depicts one embodiment of a computing node utilized in certain embodiments of the present invention.

Referring now to FIG. 7, a schematic of an example of a computing node, which can be communicatively coupled to elements of the system described to obtain data is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

Embodiments of the present invention provide a method of utilizing a UAS with sensors in order to collect data that can be utilized to calibrate instruments of a satellite. The UAS in controlled by a computer system utilizing a communication channel to control navigational systems of the UAS. Data collected by the sensors in the UAS is obtained by the computing node through a communications channel. In an embodiment of the present invention, a UAS with sensors for measuring at least one characteristic of a surface is deployed in a predetermined geographic location, where the sensors are selected to match spectral channels of instruments in a satellite. The UAS is deployed in a flight path that matches satellite view geometry of a satellite, based on a pre-mission flight plan of the satellite. In an embodiment of the present invention, the UAS is flown at a distance of approximately 1-10 m from the surface from which the sensors take measurements.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

What is claimed is:

1. A computer-implemented method, comprising:
    obtaining, by one or more processors, a pre-mission flight plan of a satellite, wherein the satellite comprises remote sensing instruments configured to capture satellite data comprising data selected from a data type consisting of: near surface directional observations and hemispheric directional observations for a portion of a surface below the satellite, wherein the surface comprises a surface of a defined geographic area;
    configuring, by the one or more processors, over a communications connection, one or more sensors on an unmanned aircraft system, to capture data related to the surface of the defined geographic area, wherein the one or more sensors are selected to match spectral channels of the remote sensing instruments in the satellite, and wherein the data captured by the one or more sensors is of the same data type as the satellite data;
    navigating, by the one or more processors, the unmanned aircraft system in a repeatable defined travel path proximate to the defined geographic area, the repeatable defined travel path based on the pre-mission flight plan of the satellite, such that the one or more sensors capture surface data related to the defined geographic area during the navigating, wherein the repeatable defined travel path of the unmanned aircraft system is within a view geometry of the remote sensing instruments of the satellite;
    maintaining, by the one or more processors, the unmanned aircraft system at a distance from the surface of the defined geographic area at which atmosphere does not obscure the data captured by the one or more sensors;
    maintaining, by the one or more processors, a fixed length between the one or more sensors and the surface of the defined geographic area for view angles utilized to capture the data, during the repeatable defined travel path of the unmanned aircraft system;
    obtaining, by the one or more processors, based on maintaining the distance and the length, the data captured by the one or more sensors;
    comparing, by the one or more processors, the data captured by the one or more sensors of the unmanned aircraft system to satellite data collected by the remote sensing instruments of the satellite related to the defined geographic area; and
    validating, by the one or more processors, a calibration of the remote sensing instruments of the satellite, based on determining, by the one or more processors, that the data captured by the one or more sensors of the unmanned aircraft system matches the data collected by the remote sensing instruments of the satellite, within a predefined tolerance.

2. The computer-implemented method of claim 1, where a first sensor of the one or more sensors is an upward viewing sensor and a second sensor of the one or more sensors is a downward viewing sensor.

3. The computer-implemented method of claim 2, wherein the first sensor obtains data by observing total incoming energy in a hemisphere above the defined geographic area.

4. The computer-implemented method of claim 2, wherein the second sensor obtains data by observing outgoing surface energy of the pre-defined geographic area at a given view angle.

5. The computer-implemented method of claim 4, further comprising:
    modifying, by the one or more processors, the second sensor to collect data at multiple view angles.

6. The computer-implemented method of claim 2, wherein the first sensor measures total incoming optical energy in a hemisphere over the defined geographic area.

7. The computer-implemented method of claim 2, wherein the second measures reflected energy in a direction of interest from the surface.

8. The computer-implemented method of claim 1, wherein the distance from the surface is one to twenty meters above the surface.

9. A computer program product comprising:
    a non-transitory computer readable storage medium readable by one or more processors and storing instructions for execution by the one or more processors for performing a method comprising:

obtaining, by the one or more processors, a pre-mission flight plan of a satellite, wherein the satellite comprises remote sensing instruments configured to capture satellite data comprising data selected from a data type consisting of: near surface directional observations and hemispheric directional observations for a portion of a surface below the satellite, wherein the surface comprises a surface of a defined geographic area;

configuring, by the one or more processors, over a communications connection, one or more sensors on an unmanned aircraft system, to capture data related to the surface of the defined geographic area, wherein the one or more sensors are selected to match spectral channels of the remote sensing instruments in the satellite, and wherein the data captured by the one or more sensors is of the same data type as the satellite data;

navigating, by the one or more processors, the unmanned aircraft system in a repeatable defined travel path proximate to the defined geographic area, the repeatable defined travel path based on the pre-mission flight plan of the satellite, such that the one or more sensors capture surface data related to the defined geographic area during the navigating, wherein the repeatable defined travel path of the unmanned aircraft system is within a view geometry of the remote sensing instruments of the satellite;

maintaining, by the one or more processors, the unmanned aircraft system at a distance from the surface of the defined geographic area at which atmosphere does not obscure the data captured by the one or more sensors;

maintaining, by the one or more processors, a fixed length between the one or more sensors and the surface of the defined geographic area for view angles utilized to capture the data during the repeatable defined travel path of the unmanned aircraft system;

obtaining, by the one or more processors, based on maintaining the distance and the length, the data captured by the one or more sensors;

comparing, by the one or more processors, the data captured by the one or more sensors of the unmanned aircraft system to satellite data collected by the remote sensing instruments of the satellite related to the defined geographic area; and validating, by the one or more processors, a calibration of the remote sensing instruments of the satellite, based on determining, by the one or more processors, that the data captured by the one or more sensors of the unmanned aircraft system matches the data collected by the remote sensing instruments of the satellite, within a predefined tolerance.

10. The computer program product of claim 9, where a first sensor of the one or more sensors is an upward viewing sensor and a second sensor of the one or more sensors is a downward viewing sensor.

11. The computer program product of claim 10, wherein the first sensor obtains data by observing total incoming energy in a hemisphere above the defined geographic area.

12. The computer program product of claim 10, wherein the second sensor obtains data by observing outgoing surface energy of the pre-defined geographic area at a given view angle.

13. The computer program product of claim 12, further comprising:

modifying, by the one or more processors, the second sensor to collect data at multiple view angles.

14. The computer program product of claim 10, wherein the first sensor measures total incoming optical energy in a hemisphere over the defined geographic area.

15. The computer program product of claim 10, wherein the second measures reflected energy in a direction of interest from the surface.

16. A system comprising:

a memory;

one or more processors in communication with the memory;

one or more sensors and a second one or more sensors in communication with the one or more processors over a wireless communications connection; and program instructions executable by the one or more processors via the memory to perform a method, the method comprising:

obtaining, by the one or more processors, a pre-mission flight plan of a satellite, wherein the satellite comprises remote sensing instruments configured to capture satellite data comprising data selected from a data type consisting of: near surface directional observations and hemispheric directional observations for a portion of a surface below the satellite, wherein the surface comprises a surface of a defined geographic area;

configuring, by the one or more processors, over a communications connection, one or more sensors on an unmanned aircraft system, to capture data related to the surface of the defined geographic area, wherein the one or more sensors are selected to match spectral channels of the remote sensing instruments in the satellite, and wherein the data captured by the one or more sensors is of the same data type as the satellite data;

navigating, by the one or more processors, the unmanned aircraft system in a repeatable defined travel path proximate to the defined geographic area, the repeatable defined travel path based on the pre-mission flight plan of the satellite, such that the one or more sensors capture surface data related to the defined geographic area during the navigating, wherein the repeatable defined travel path of the unmanned aircraft system is within a view geometry of the remote sensing instruments of the satellite;

maintaining, by the one or more processors, the unmanned aircraft system at a distance from the surface of the defined geographic area at which atmosphere does not obscure the data captured by the one or more sensors;

maintaining, by the one or more processors, a fixed length between the one or more sensors and the surface of the defined geographic area for view angles utilized to capture the data during the repeatable defined travel path of the unmanned aircraft system;

obtaining, by the one or more processors, based on maintaining the distance and the length, the data captured by the one or more sensors;

comparing, by the one or more processors, the data captured by the one or more sensors of the unmanned aircraft system to satellite data collected by the remote sensing instruments of the satellite related to the defined geographic area; and validating, by the one or more processors, a calibration of the remote sensing instruments of the satellite, based on determining, by the one or more processors, that the data captured by the one or more sensors of the unmanned aircraft system matches the data collected by the remote sensing instruments of the satellite, within a predefined tolerance.

\* \* \* \* \*